Figure 1:
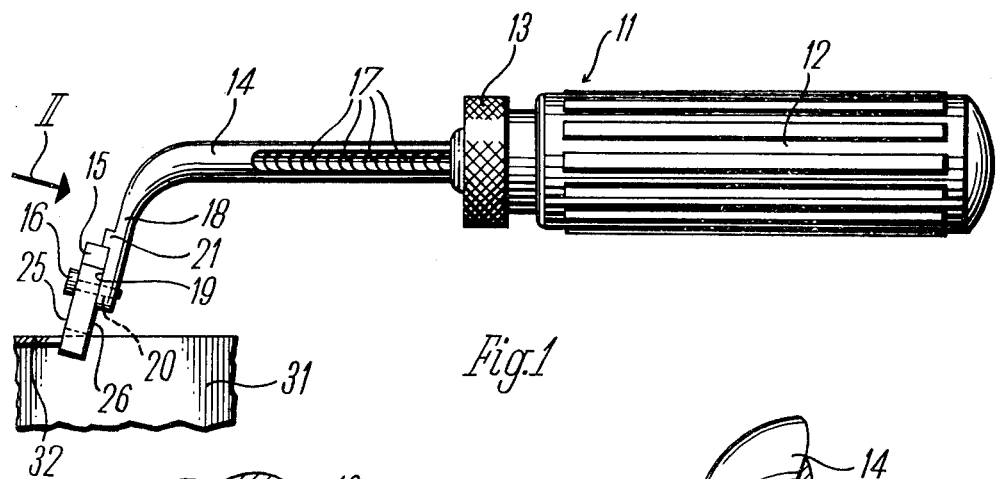

United States Patent [19]
Ehrenberg et al.

[11] 3,895,439
[45] July 22, 1975

[54] HAND TOOL

[75] Inventors: Henry Ehrenberg, Knittlingen, Germany; Mordechai-Gustav Hirsch, Nahariyya, Israel

[73] Assignee: Snel AG, Zug, Switzerland

[22] Filed: June 20, 1973

[21] Appl. No.: 371,730

[30] Foreign Application Priority Data
Oct. 13, 1972    Germany............................ 2250265

[52] U.S. Cl. ...................... 30/171; 30/339; 15/236
[51] Int. Cl. .............................................. B26b 1/04
[58] Field of Search ............. 30/169, 171, 339, 351; 15/236 R; 81/177 A

[56] References Cited
UNITED STATES PATENTS

| | | | |
|---|---|---|---|
| 670,120 | 3/1901 | Van Tuyl .......................... 15/236 X |
| 925,259 | 6/1909 | Ziegler .................................. 30/171 |
| 1,768,537 | 7/1930 | Alexander............................ 30/171 |
| 2,747,911 | 5/1956 | Kuever............................. 15/236 X |
| 2,824,323 | 2/1958 | Tos .................................. 15/236 X |
| 2,963,930 | 12/1960 | Clothier............................ 81/177 A |

*Primary Examiner*—Al Lawrence Smith
*Assistant Examiner*—J. C. Peters
*Attorney, Agent, or Firm*—Brumbaugh, Graves, Donohue & Raymond

[57] ABSTRACT

The blade of a deburring tool has a V-shaped cutting edge enabling two edges of a workpiece to be deburred simultaneously. In one embodiment the blade is a generally triangular plate with a V-shaped notch in each corner and is clamped to a blade holder by a central screw so that the blade can be indexed round. In another embodiment the cutting edge is formed on a V-shaped portion of an angled rod whose shank is rotatable in the holder.

10 Claims, 5 Drawing Figures

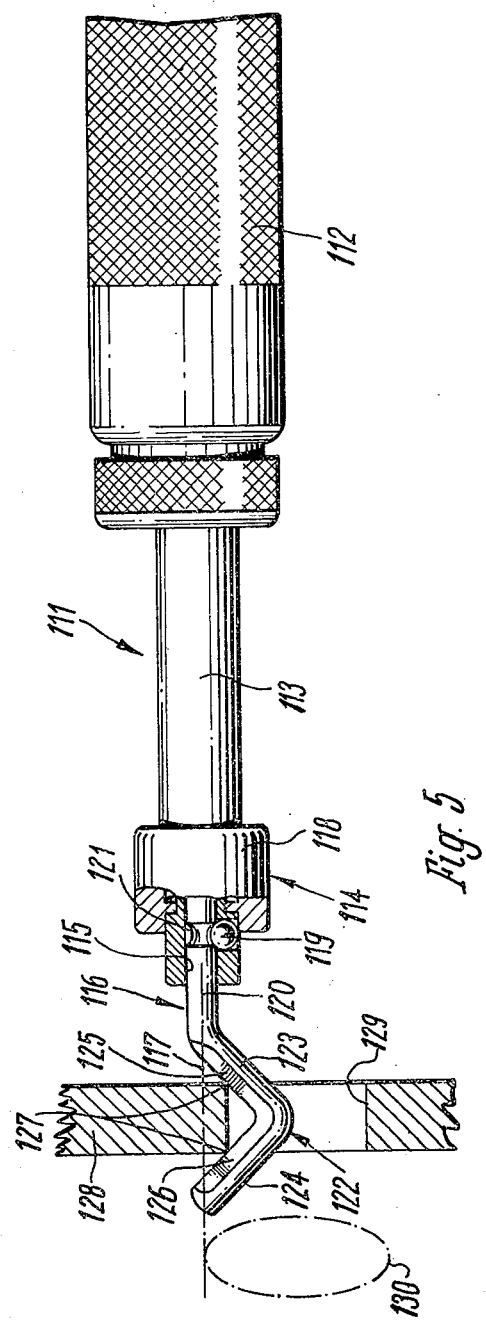

HAND TOOL

The invention relates to hand deburring tools.

Known hand tools for deburring have a bar-like blade holder which is longitudinally displaceable in a handle. A blade of crank-like construction is rotatably accommodated in the blade holder and adjusts itself to the prevailing cutting direction during the deburring operation. This tool operates satisfactorily, although some care has to be taken in guiding the blade when deburring long straight edges in order to obtain a smooth cut. Furthermore, this tool can be used only to work one edge of a workpiece at a time. Also, the blade has only one cutting edge, so that it frequently has to be reground. Although the blade is not very expensive to manufacture, it would be very expensive to use if it were discarded after the single cutting edge became blunt, as is increasingly demanded nowadays.

The object of the invention is to provide a tool by means of which it is a simpler matter to work the edges of metal sheets or the like and which has a longer lifetime than the known tools.

In accordance with the invention, a blade having at least one V-shaped cutting edge for simultaneously deburring two edges of a workpiece is interchangeably mounted on the blade holder.

In accordance with an advantageous feature of the invention, the blade is a plate of a triangular basic shape and has three notches. The blade thus has a total of eighteen cutting edges and a total of six double cutting edges for deburring sheet metal and six cutting edges for scraping.

With such a large number of cutting edges on one plate of relatively small dimensions, it is possible to manufacture the plate from a relatively expensive hard metal and/or to manufacture it as a disposable blade, thus avoiding the expensive regrinding operation.

Advantageously, the blade holder can be in the form of an obliquely bent bar, and the blade can be mounted on the bent portion. This provides an advantageously sloping working position which can be used both for deburring and for scraping.

The blade holder can have a row of longitudinally arranged depressions. The handle can have a locking device which co-operates with the depressions for the purpose of exchanging and adjusting the position of the handle. A handle having a locking device of this kind has already been described in Published German Pat. Specification (Offenlegungsschrift) No. 2,129,768. A particular advantage of the tool in accordance with the invention is that it may be used as an accessory for the other tool, so that only the blade holder and the blade has to be purchased for the other tool, and not a new handle.

Further advantages and features of the invention are described in conjunction with the accompanying drawings which illustrate two embodiments of the invention.

Figures 2, 3:
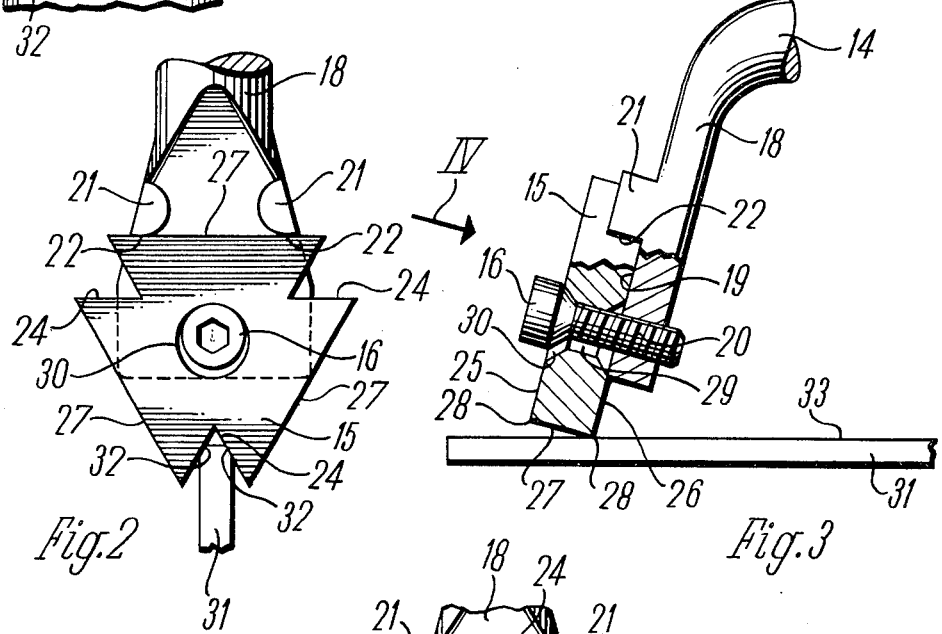
Figure 4:
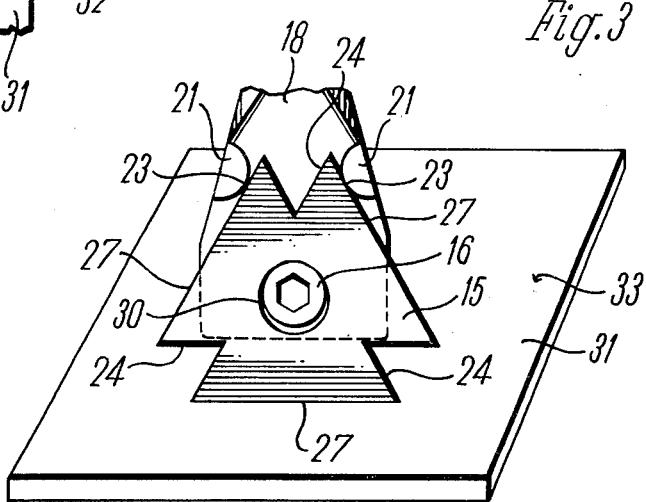

In the drawings:

FIG. 1 is a side view of one embodiment of a hand tool constructed in accordance with the invention, FIG. 2 is a greatly enlarged plan view of the blade and the portion of the blade holder of the tool, viewed in the direction of the arrow II in FIG. 1, FIG. 3 is a side view of a detail, shown in a different working position, FIG. 4 is a plan view of the blade and a portion of the blade holder, viewed in the direction of the arrow IV in FIG. 3, and FIG. 5 is a partially sectioned side view of a different embodiment when working on the workpiece.

Referring to FIG. 1, a hand tool 11 has a handle 12 having a locking device 13, a blade holder 14, and a blade 15 which is fixed to the blade holder 14 by means of a screw 16. The handle with the locking device 13 can be of the type which is illustrated in the above-mentioned German Specification No. 2,129,768. The locking device comprises a locking ball (not visible in the drawing) which engages into one of a series of depressions 17, provided one behind the other on the blade holder, and which may be fixed and released by means of an axially displaceable sleeve.

The blade holder 14 comprises a bar which has a straight portion incorporating the depressions 17 and whose end remote from the handle 12 has a bent portion 18 which is angled by approximately 60° with respect to the straight portion.

A substantially plane support face 19 for the blade is provided in the region of the bent portion 18 of the blade holder and is directed towards the free end of the latter. A bore 20 for receiving the screw 16 is located in the region of the support face 19. Furthermore, two dog-like projections 21 are provided in the region of the support face, each projection 21 forming two stops 22 (FIG. 2) and 23 (FIG. 4) for the blade.

The shape of the blade 15 is that of an equilaterally triangular plate with V-shaped notches 24 at its corners. The front face 25 and the rear face 26 of the blade each form cutting edges on both sides of the V, i.e., the two sides of the V are ground square. The sides 27 of the triangle located between the three notches 24 form respective straight cutting edges 28 at the front 25 and the rear 26 faces of the blade. The basic shape of the blade is that of a small plate, i.e., the front and the rear of the blade are defined by parallel surfaces, and the blade has a central bore 29 for receiving the screw 16. As may be seen particularly from FIG. 3, the central bore is provided at the front and the rear of the plate with countersunk portions 30 complementary to a corresponding chamfered portion of the screw 16.

Referring to FIGS. 1 and 2, the hand tool is shown in its working position for deburring sheet metal. The blade 15 is so turned that one of the notches 24 is aligned with the bent portion 18. The screw 16 is tightened again after appropriate adjustment of the tool, the sloping surface of the screw 16 co-operating with the countersunk portion 30 on the front face 25 in the manner shown in FIG. 3, and the blade is pressed against the stops 22 on the projections 21. This advantageous effect is occasioned by the fact that the distance between the stops and the bore 20 is less than the centre-to-centre distance between the bore 29 and the side 27 forming the stop face on the blade when in this position.

Thus, when in this position, the tool can be used to deburr the edges 32 of a sheet metal plate 31 by a pulling movement (towards the right in FIG. 1). If the cutting edge which is being used should be blunt, a fresh notch 24 with sharp cutting edges can be brought into the working position by loosening the screw and turning the blade through 120°.

FIGS. 3 and 4 show the tool when scraping. The tool has been turned through 60° or 180° relative to the position shown in FIGS. 1 and 2. Two of the sides 27 now form stop faces on the blade and abut against the stops 23 on the projection 21. Thus, the cutting edge 28 on one side 27 (see FIG. 3) is brought into the working position for scraping the surface 33 of a workpiece. As previously mentioned a fresh cutting edge can be brought into the scraping position by loosening the screw and turning the blade through 120°. In the same manner as when deburring, a further set of cutting edges can be brought into use by turning the blade over since the front and rear faces 25 and 26 are identical to one another.

The tool 111 illustrated in FIG. 5, can be used to deburr the front and rear edges of a workpiece in a single working operation and enables a relatively small bore at the front and rear edge of a workpiece to be deburred in a single working operation. The rear edge can be so located that it would normally be inaccessible from the front.

As is shown in FIG. 5 the tool 111 has a handle 112 which is gripped manually and in which a blade holder 113 is so arranged that it is longitudinally adjustable and fixable relative to the handle. A blade 116 can be rotated about an axis of rotation 117 in a longitudinal bore 115 at the free end, i.e., head 114, of the blade holder 113, although the blade is substantially fixed in a longitudinal direction. The blade 116 can be interchanged by means of a device comprising a stop ball 119 and a sleeve 118 which is longitudinally displaceable against the force of a spring (not visible in the drawing) contained inside the sleeve. Alternatively, a transverse bore may be provided in which the blade 116, also fixed by the ball 119, can be rotatably arranged.

The blade 116 has a shank 120 which is partially located in the longitudinal bore 115 and which has a continuous groove 121 which is adapted to the ball and which serves to axially fix and guide the blade. The shank, extending in the direction of the axis of rotation 117, has contiguous to its end located outside the longitudinal bore a V-shaped tool portion produced by appropriate bending of the rod or wire material forming the shank. In the illustrated embodiment, the tool portion 122 is in the shape of a V whose arm 123, located nearer to the tool holder, slopes away from the shank 120, while the other arm 124 is contiguous to the arm 123 and leads back towards the axis of rotation 117. The inside of the V thus formed is occupied by two cutting portions 125, 126. The cutting portion 125 is located nearer to the blade holder or to the shank 120 of the blade and is directed obliquely away from the latter towards the axis of rotation 117, while the cutting edge 126 is located on the arm 124 and is directed obliquely towards the shank 120 or the blade holder 113 and also faces the axis of rotation 117.

The two cutting edges 125, 126 are so located outside the axis of rotation 117 that two edges 127 of a workpiece 128 to be deburred engage the cutting edges 125, 126 outside the axis of rotation 117 by virtue of the workpiece entering the notch formed by the V-shaped cutting edge.

The cutting portion 125, 126 may be formed by grinding the arms 123, 124 on both sides. The tool can then be used in both cutting directions.

The tool constructed in accordance with FIG. 5 is used in the following manner:

In the present case, the workpiece 128 is a thick sheet metal plate having a circular bore 129 and, as shown in the drawing, the blade 116 is applied to the workpiece 128 by holding the axis of rotation of the blade 116 parallel to the axis of the bore 129 and pressing the tool outwardly against the edges 127. The axis of rotation then passes through the workpiece 128 outside the bore 129. The device is then gyrated manually, such that the axis of rotation 117 of the blade 116 remains parallel and only describes the path indicated in slight perspective by the dash-line 130. The two cutting portions 125, 126 thus deburr the front and the rear edges 127.

The blade adjusts itself to the most favourable cutting angle. This advantageous self-adjustment of the blade is provided by offsetting the point at which the edges 127 engage the cutting portions 125, 126 relative to the axis of rotation 117 and follows the prevailing position of the edge of the tool in the manner of a crank.

It may be seen that two edges of a workpiece can be deburred simultaneously by means of the tool in accordance with FIG. 5, even when the workpiece is accessible from only one side. Advantageously, more difficult deburring tasks can be carried out if the holder 113 has a transverse bore for the blade as mentioned above. Thus, the blade may not only permit work to be carried out 50 percent more rapidly owing to the double cut, but can also be used at very inaccessible places. The described blade having the V-shaped cutting edge is particularly advantageous, the cutting portions preferably being at an angle of about 90°. With this embodiment, it is ensured that the chamfer produced during deburring is at the same angle of 45° to its defining edges over the entire range of thickness of workpieces for which the blade is intended. If it is not a matter of providing a chamfer with a uniform angle of 45° the blade may have a different cutting edge, for example a semicircular cutting edge. Normally, the two cutting edges 125, 126 merge into one another by means of a small rounded region. Alternatively, however, they could be arranged separately, so that very thin portions, located in the region not provided with cutting edges, would not be deburred.

We claim:

1. A hand tool comprising in combination a handle, a blade holder secured to said handle, a blade having at least three straight peripheral surfaces defining cutting edges for surface scraping and means pivotally attaching said blade to said holder, said blade having thereon at least three peripheral notches each of which forms a substantially V-shaped cutting edge for simultaneously deburring two edges of a workpiece, said holder comprising a pair of stop surfaces engagable with one of said straight surfaces to retain said blade in position for deburring of the workpiece, and with respective ones of said straight surfaces to retain said blade in position for surface scraping of the workpiece.

2. A hand tool according to claim 1, in which said blade comprises a plate having a plurality of corners each of said notches being located at one of said corners and in which said attaching means comprises a central bore in said blade and a screw passing through said bore into said blade holder.

3. A hand tool according to claim 1 in which said blade has front and rear faces each defining respective straight and V-shaped cutting edges.

4. A hand tool according to claim 2 in which said plate has a triangular basic shape.

5. A hand tool according to claim 1 in which said blade holder comprises an obliquely angled bar having a bent portion on which said blade is mounted by said attaching means.

6. A hand tool according to claim 1 comprising locking means adjustably releasably attaching said blade holder to said handle, said locking means comprising a longitudinal row of depressions on said holder and releasable detent means on said handle and selectively co-operating with said depressions.

7. The tool as recited in claim 1 in which each of said straight edges is flanked by a pair of said notches and each of said notches is flanked by a pair of said straight edges.

8. A tool comprising a blade releasably attached to a holder and having a substantially V-shaped cutting edge, said blade and said holder having cooperating stop surfaces selectively to retain said blade in its operating positions, the front and rear surfaces of said blade being beveled adjacent the periphery of a bore passing through said blade to receive a screw mounted in said holder, the distance between the axis of said screw and the stop surface on said holder being less than the distance between the axis of said bore and the stop surface on said blade.

9. A tool comprising in combination a blade and means for interchangeably attaching said blade to a holder, said blade comprising a plate having at least three straight outer cutting edges for surface scraping and at least three corners with a V-shaped cutting edge in the form of a notch at each said corner for simultaneously deburring two edges of a workpiece, the blade holder comprising first stop means on said blade holder and cooperating with a stop face on the periphery of said blade for preventing rotation of said blade around its attaching means to locate said blade in a position in which one of said notches is in its working position for deburring sheet metal and second stop means on said blade holder and cooperating with the periphery of said blade for preventing rotation of said blade to locate said blade in a position in which one of said straight outer cutting edges of the blade is in its working position for surface scraping, and in which said attaching means comprises a central bore in said blade and a screw passing through said bore into said blade holder.

10. A hand tool according to claim 9 in which said first and second stop means are formed respectively by two projections of the blade holder, each of said projections having a stop surface for engaging said blade.

* * * * *